(12) United States Patent
Siegwart et al.

(10) Patent No.: US 7,930,325 B2
(45) Date of Patent: Apr. 19, 2011

(54) LOCALITY WITH PARALLEL HIERARCHICAL COPYING GARBAGE COLLECTION

(75) Inventors: David K. Siegwart, Hampshire (GB); Martin Hirzel, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 397 days.

(21) Appl. No.: 12/129,067

(22) Filed: May 29, 2008

(65) Prior Publication Data

US 2008/0235308 A1    Sep. 25, 2008

Related U.S. Application Data

(63) Continuation of application No. 11/450,946, filed on Jun. 9, 2006, now abandoned.

(51) Int. Cl.
*G06F 17/30* (2006.01)
*G06F 17/00* (2006.01)

(52) U.S. Cl. ........ 707/813; 707/814; 707/815; 707/816; 707/817; 707/818; 707/819; 707/820

(58) Field of Classification Search ........... 707/999.206, 707/813–820
See application file for complete search history.

(56) References Cited

U.S. PATENT DOCUMENTS

| | | | |
|---|---|---|---|
| 6,321,240 B1 | 11/2001 | Chilimbi et al. | |
| 6,421,689 B1 | 7/2002 | Benson et al. | |
| 6,892,212 B2 | 5/2005 | Shuf et al. | |
| 6,965,905 B2 * | 11/2005 | Garthwaite | ............... 1/1 |

OTHER PUBLICATIONS

Robert Courts, "Improving Locality of Reference in a Garbage-Collecting Memory Management System," Communications of the ACM, vol. 31, No. 9; pp. 1128-1138, Sep. 1988.
Adi-Tabatabai, et al., "Prefetch Injection Based on Hardware Monitoring and Object Metadata," PLDI'04; pp. 267-276, Jun. 9-11, 2004.
Attanasio, et al., "A Comparative Evaluation of Parallel Garbage Collector Implementations," H. Dietz (Ed.): LCPC 2001, LNCS 2624, pp. 177-192, 2003.
Henry G. Baker, Jr., "List Processing in Real Time on a Serial Computer," Communications of the ACM, vol. 21, No. 4; pp. 280-294, Apr. 1978.
Cahoon, et al., "Data Flow Analysis for Software Prefetching Linked Data Structures in Java," IEEE 2001, 0-7695-1363-8/01; pp. 280-291, 2001.
Cascaval, et al., "Multiple Page Size Modeling and Optimization," Proceedings of the 14th International Conference on Parallel Architectures and Compilation Techniques (PACT '05), 1089-795X/05, pp. 1-11, 2005.

(Continued)

*Primary Examiner* — Yicun Wu
(74) *Attorney, Agent, or Firm* — Scully, Scott, Murphy & Presser, P.C.; Vasken Alexanian

(57) ABSTRACT

A garbage collection algorithm that achieves hierarchical copy order with parallel garbage collection threads. More specifically, the present invention provides a garbage collection method and system for copying objects from a from-space to a to-space. The method comprises the steps of (a) having multiple threads that simultaneously perform work for garbage collection (GC), (b) examining the placement of objects on blocks, and (c) changing the placement of objects on blocks based on step (b). Preferably, the method includes the additional step of calculating a placement of object(s) based on step (b), and using the result of the calculation for step (c). For example, the calculation may be used to increase the frequency of intra-block pointers and/or to increase the frequency of siblings on the same block.

16 Claims, 9 Drawing Sheets

☐ - EMPTY (FREE) SPACE
▨ - COPIED OBJECTS (GRAY SPACE)
■ - SCANNED OBJECTS (BLACK SPACE)

OTHER PUBLICATIONS

C. J. Cheney, "A Nonrecursive List Compacting Algorithm," Communications of the ACM, vol. 13, No. 11; pp. 677-678, Nov. 1970.

Cheng, et al., "A Parallel, Real-Time Garbage Collector," PLDI 2001 Jun. 2001, Snowbird, Utah, USA; ACM ISBN, 1-58113-414; pp. 125-136.

Cher, et al., "Software Prefetching for Mark-Sweep Garbage Collection: Hardware Analysis and Software Redesign," ASPLOS '04; pp. 199-210, Oct. 9-13, 2004.

Chilimbi, et al., "Using Generational Garbage Collection to Implement Cache-Conscious Data Placement," ISMM '98, Oct. 1998; pp. 37-48.

Chilimbi, et al., "Dynamic Hot Data Stream Prefetching for General-Purpose Programs," PLD1'02, pp. 199-209, Jun. 17-19, 2002.

Imai, et al., "Evaluation of Parallel Copying Garbage Collection on a Shared-Memory Multiprocessor," IEEE Transactions on Parallel and Distributed Systems, vol. 4, No. 9; pp. 1030-1040, Sep. 1993.

E. W. Dijkstra, "Solution of a Problem in concurrent Programming Control," Communications of the ACM, vol. 8, No. 9; p. 569, Sep. 1965.

Endo, et al., "A Scalable Mark-Sweep Garbage Collector on Large-Scale Shared-Memory Machines," ACM 1997.

Flood, et al., "Parallel Garbage Collection for Shared Memory Multiprocessors," USENIX JVM Conference, Apr. 2001.

Frigo, et al., "Cache-Oblivious Algorithms," In Foundations of Computer Science (FOCS), 1999.

Robert H. Halstead, Jr., "Multilisp: A Language for Concurrent Symbolic Computation," ACM Transactions on Programming Languages and Systems, vol. 7, No. 4; pp. 501-538, Oct. 1985.

Hertz, et al., "Garbage Collection Without Paging,"PLDI'05, pp. 143-153; Jun. 12-15, 2005.

Hirzel, et al., "Understanding the Connectivity of Heap Objects," ISMM'02, pp. 36-49, Jun. 20-21, 2002.

Huang, et al., "The Garbage collection Advantage: Improving Program Locality," OOPSLA'04; pp. 69-80, Oct. 24-28, 2004.

Luk, et al., "Compiler-Based Prefetching for Recursive Data Structures," ASPLOS V11, Oct. 1996; pp. 222-233, Oct. 1996.

Inagaki, et al., "Stride Prefetching by Dynamically Inspecting Objects," PLDI'03; pp. 269-277, Jun. 9-11, 2003.

Kistler, et al., "Automated Data-Member Layout of heap Objects to Improve Memory-Hierarchy Performance," ACM Transactions on Programming Languages and Systems; vol. 22, No. 3; pp. 490-505, May 2000.

Kistler, et al., "Continuous Program Optimization: A Case Study," ACM Transactions on Programming Languages and Systems; vol. 22, No. 3; pp. 490-505, May 2000.

Lattner, et al., "Automatic Pool Allocation: Improving Performance by Controlling Data Structure Layout in the Heap," PLDI'05; pp. 129-142, Jun. 12-15, 2005.

Wu, et al., "Efficient Discovery of Regular Stride Patterns in Irregular Programs and Its Use in Compiler Prefetching," PLDI'02; pp. 210-221, Jun. 17-19, 2002.

Moon, et al., "Garbage Collection in a Large Lisp System," 1984 ACM 0-89791-142-3/84/008/0235; pp. 235-246.

Ossia, et al., "A Parallel, Incremental and concurrent GC for Servers," PLDI'02; pp. 129-140, Jun. 17-19, 2002.

Shuf, et al., "Creating and Preserving Locality of Java Applications at Allocation and Garbage Collection Times", OOPSLA'02; pp. 13-25, Nov. 4-8, 2002.

Vanderwiel, et al., "Data Prefetch Mechanisms," ACM Computing Surveys, vol. 32, No. 2; pp. 174-199, Jun. 2000.

Wilson, et al., "Effective 'Static-Graph' Reorganization to Improve Locality in Garbage-Collected Systems," Proceedings of the ACM SIGPLAN '91 Conference on Programming Language Design Implementation, pp. 177-191; Jun. 26-28, 1991.

Siegwart et al., "Improving Locality with Parallel Hierarchical Copying GC", ISMM 2006, Jun. 10-11, 2006, pp. 53-63.

Bacon et al., "A Unified Theory of Garbage Collection", OOPSLA 2004, Oct. 24-28, 2004, pp. 50-68.

Kamada et al., "Efficient Parallel Global Garbage Collection on Massively Parallel Computers", IEEE Super Computing 1994, pp. 79-88.

* cited by examiner

- EMPTY (FREE) SPACE
- COPIED OBJECTS (GRAY SPACE)
- SCANNED OBJECTS (BLACK SPACE)

US 7,930,325 B2

LOCALITY WITH PARALLEL HIERARCHICAL COPYING GARBAGE COLLECTION

CROSS REFERENCE TO RELATED APPLICATION

This application is a continuation application of application Ser. No. 11/450,946, filed Jun. 9, 2006 now abandoned.

BACKGROUND OF THE INVENTION

1. Field of the Invention

This invention generally relates to automatic memory management, and more specifically, the invention relates to methods and systems for copying garbage collection.

2. Background Art

In operation, computer programs spend a lot of time stalled in cache and Translation Lookaside Buffer (TLB) misses, because computation tends to be faster than memory access. For example, Adl-Tabatabai et al. report that the SPECjbb2000 benchmark spends 45% of its time stalled in misses on an Itanium processor [Ali-Reza Adl-Tabatabai, Richard L. Hudson, Mauricio J. Serrano, and Sreenivas Subramoney. Prefetch injection based on hardware monitoring and object metadata. In *Programming Language Design and Implementation* (PLDI), 2004]. Better locality reduces misses, and thus improves performance. For example, techniques like prefetching or cache-aware memory allocation improve locality, and can significantly speedup the performance of a program.

Locality is in part determined by the order of heap objects in memory. If two objects reside on the same cache line or page, then an access to one causes the system to fetch this cache line or page. A subsequent access to the other object is fast. Copying garbage collection (GC) can change the order of objects in memory. To improve locality, copying GC should strive to colocate related objects on the same cache line or page.

Copying GC traverses the graph of heap objects, copies objects when it reaches them, and recycles memory of unreachable objects afterwards. Consider copying a binary tree of objects, where each cache line can hold three objects. When the traversal uses a FIFO queue, the order is breadth-first and results in the cache line layout in FIG. 1A. When the traversal uses a LIFO stack, the order is depth-first and results in the cache line layout in FIG. 1B. In both cases, most cache lines hold unconnected objects. For example, breadth-first order colocates $o_{10}$ and $o_{11}$ with $o_{12}$, even though $o_{12}$ will usually not be accessed together with $o_{10}$ or $o_{11}$.

Intuitively, it is better if an object occupies the same cache line as its siblings, parents, or children. Hierarchical copy order achieves this (FIG. 1C). Moon invented a hierarchical GC in 1984, and Wilson, Lam, and Moher improved it in 1991 [Paul R. Wilson, Michael S. Lam, and Thomas G. Moher. Effective "static-graph" reorganization to improve locality in a garbage-collected system. In *Programming Language Design and Implementation* (PLDI), 1991], calling it "hierarchical decomposition". The algorithms by Moon and by Wilson, Lam, and Moher use only a single GC thread. Using multiple parallel GC threads reduces GC cost, and most product GCs today are parallel.

SUMMARY OF THE INVENTION

An object of this invention is to reduce cache and TLB misses by changing the order in which a parallel garbage collector copies heap objects.

Another object of the present invention is to provide a garbage collection algorithm that achieves hierarchical copy order with parallel garbage collection threads.

A further object of this invention is to improve locality with parallel hierarchical copying garbage collection.

Another object of the invention is to provide a garbage collection algorithm that both reduces cache and TLB misses through hierarchical copying and also maintains good scaling on multiprocessors.

These and other objectives are attained with a garbage collection algorithm that achieves hierarchical copy order with parallel garbage collection threads. More specifically, the present invention provides a garbage collection method and system. The term "block" as used herein refers to a cache line or page or other unit of OS+HW support for memory hierarchy.

The preferred embodiment of the invention, described in detail below, reduces cache and TLB misses and, in this way, improves program run time. Also, parallel garbage collection improves scaling on multi-processor machines.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 2:
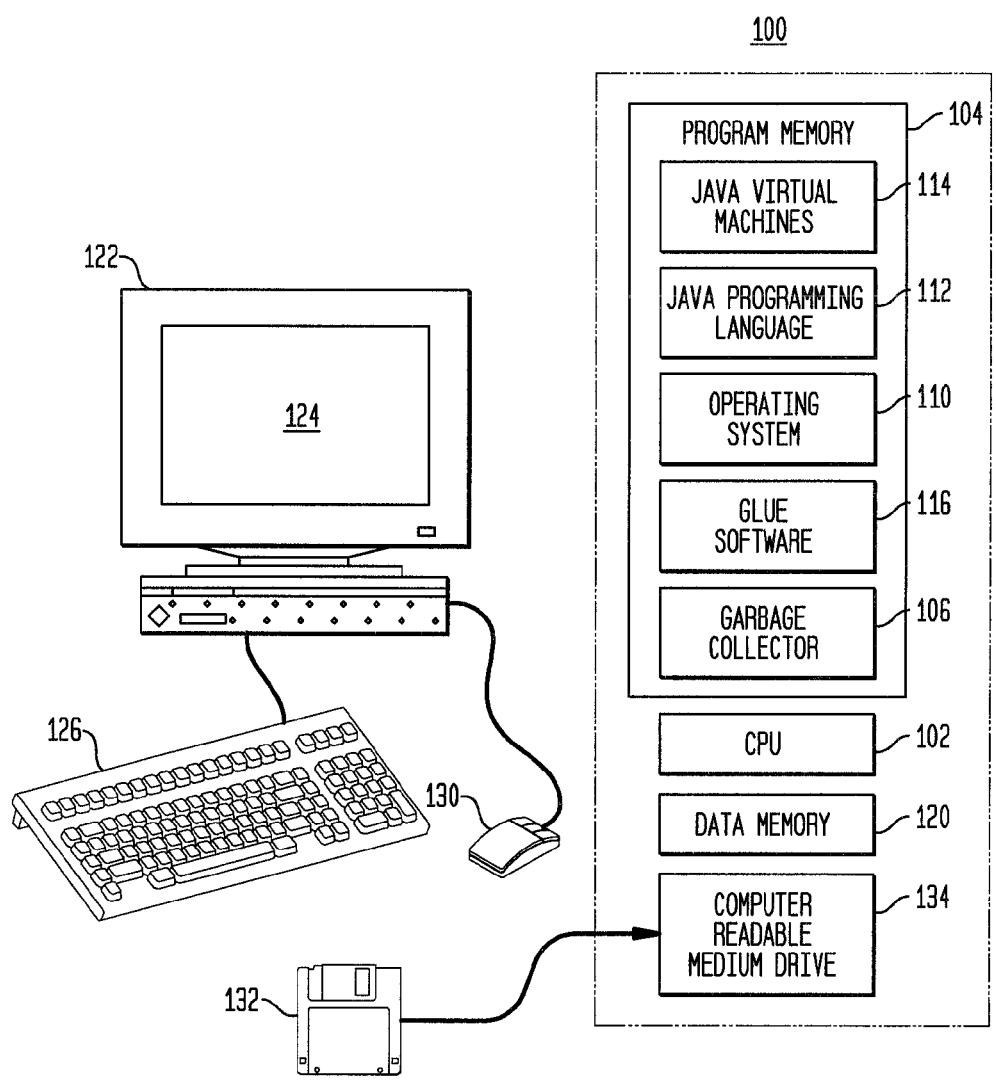
FIG. 2 is a block diagram illustrating a computer system that may be used in the practice of the present invention.
Figure 3:
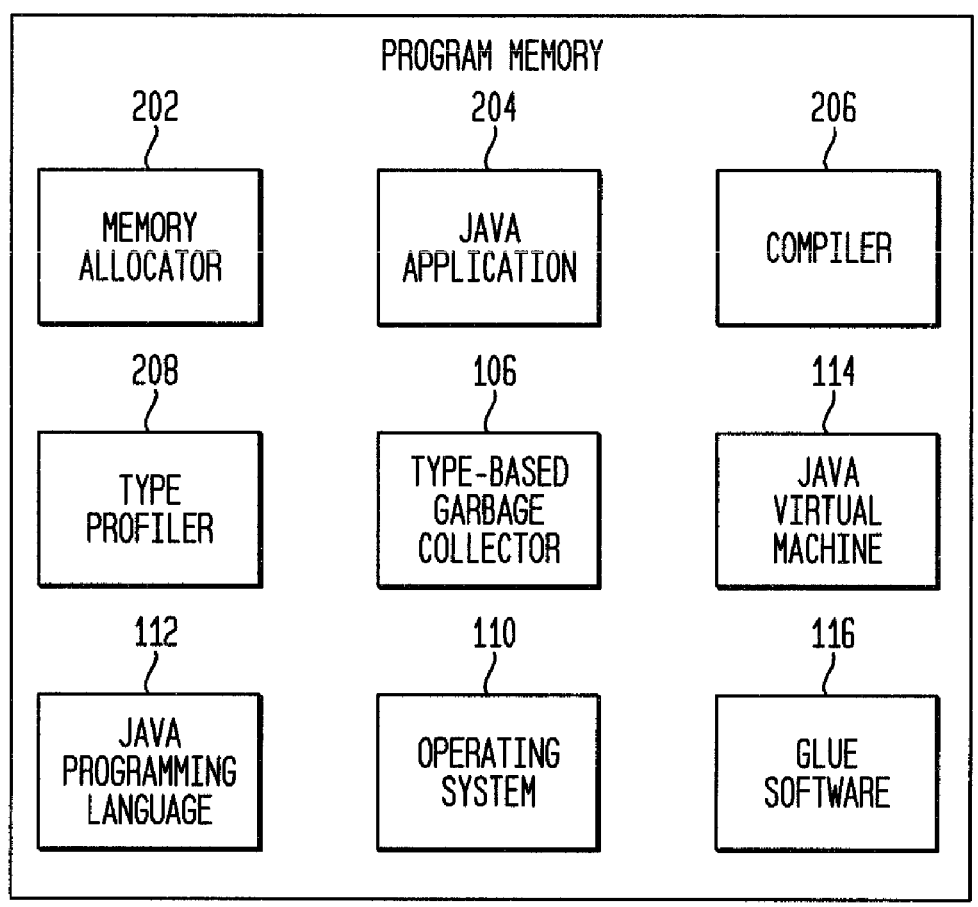
FIG. 3 is a more detailed block diagram showing a program memory of the computer system of FIG. 2.

In accordance with the present invention, a garbage collection algorithm is provided that achieves hierarchical copy order with parallel garbage collection threads. FIGS. 2 and 3 illustrate, as an example, one suitable computer system in which the present invention may be used. This computer system 100, according to the present example, includes a controller/processor 102, which processes instructions, performs calculations, and manages the flow of information through the computer system 100. Additionally, the controller/processor 102 is communicatively coupled with program memory 104. Included within program memory 104 are a garbage collector 106, operating system platform 110, Java Programming Language 112, Java Virtual Machine (JVM) 114, glue software 116, a memory allocator 202, Java application 204, a compiler 206, and a type profiler 208. It should be noted that while the present invention is demonstrated using the Java Programming Language, it would be obvious to those of ordinary skill in the art, in view of the present discussion, that alternative embodiments of the invention are not limited to a particular computer programming language.

The operating system platform 110 manages resources, such as the data stored in data memory 120, the scheduling of tasks, and processes the operation of the garbage collector 106 in the program memory 104. The operating system platform 110 also manages a graphical display interface (not shown) that directs output to a monitor 122 having a display screen 124, a user input interface (not shown) that receives inputs from the keyboard 126 and the mouse 130, and communication network interfaces (not shown) for communicating with a network link (not shown). Additionally, the operating system platform 110 also manages many other basic tasks of the computer system 100 in a manner well known to those of ordinary skill in the art.

Glue software 116 may include drivers, stacks, and low level application programming interfaces (API's) and provides basic functional components for use by the operating system platform 110 and by compatible applications that run on the operating system platform for managing communications with resources and processes in the computing system 100.

Each computer system 100 may include, inter alia, one or more computers and at least a computer readable medium 132. The computers preferably include means 134 for reading and/or writing to the computer readable medium 132. The computer readable medium 132 allows a computer system 100 to read data, instructions, messages or message packets, and other computer readable information from the computer readable medium. The computer readable medium, for example, may include non-volatile memory, such as Floppy, ROM, Flash memory, disk drive memory, CD-ROM, and other permanent storage. It is useful, for example, for transporting information, such as data and computer instructions, between computer systems.

The present invention, as mentioned above, provides a garbage collection algorithm that achieves hierarchical copy order with parallel garbage collection threads. The prior art has not been able to achieve this. In order to best understand the significance and advantages of the present invention, several prior art garbage collection algorithms, shown in FIGS. 4-10, are discussed below.

Figure 4:
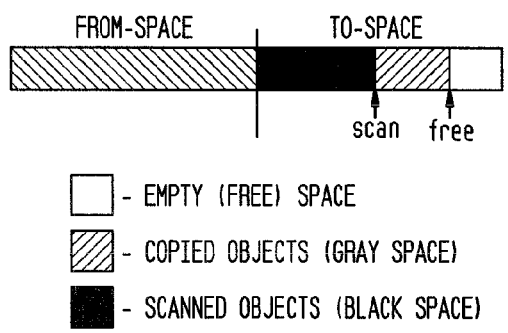
FIGS. 4-9 show prior art garbage collection copying procedures.

FIG. 4 illustrates Cheney's copying GC algorithm [C. J. Cheney. A nonrecursive list compacting algorithm. *Communications of the ACM (CACM)*, 13(11), 1970]. Memory has two semi-spaces, from-space and to-space. At GC start, all heap objects are in from-space, and all of to-space is empty. GC first scans the program variables for pointers to heap objects, and copies their target objects from-space to-space. Copied objects are gray, and a "free" pointer keeps track of the boundary between gray objects and the empty part of to-space. Next, GC scans copied objects for pointers to from-space, and copies their target objects to-space. Scanned objects are black, and a "scan" pointer keeps track of the boundary between black objects and gray objects. When the scan pointer catches up to the free pointer, GC has copied all heap objects that are transitively reachable from the program variables. From-space is discarded, and the program continues, using the objects in to-space.

Figure 1A:
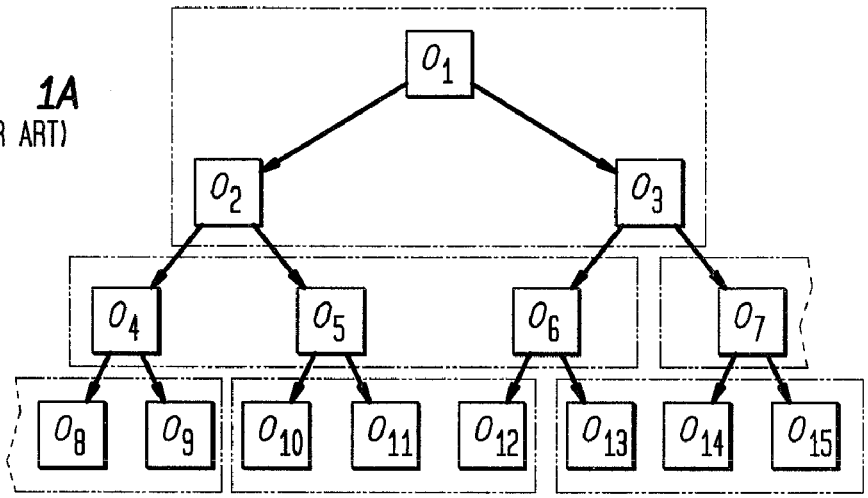
FIGS. 1A, 1B and 1C illustrate, respectively, a breadth first copy order, a depth first copy order, and a hierarchical copy order.

Cheney's algorithm copies in breadth-first order (see FIG. 1A), because it scans gray objects first-in-first-out. One advantage of Cheney's algorithm is that it requires no separate stack or queue to keep track of its progress, saving space and keeping the implementation simple. Cheney's algorithm uses only one thread for garbage collection, it is not parallel.

Figure 5:
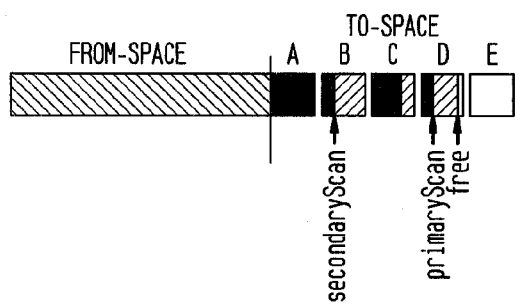

Moon modified Cheney's algorithm to improve locality by copying in hierarchical order instead of breadth-first. FIG. 5 illustrates Moon's algorithm [David A. Moon. Garbage collection in a large Lisp system. In *LISP and Functional Programming (LFP)*, 1984]. To-space is now divided into blocks. As before, objects are copied by bumping the free pointer, which separates gray objects from empty space. But instead of just one scan pointer, Moon maintains two scan pointers. The primary scan pointer is always in the same block as the free pointer. For example, in FIG. 5, both the primary scan pointer and the free pointer point into block D.

If there are gray objects at the primary scan pointer, Moon scans them. If the free pointer reaches the next block (for example E), Moon advances the primary scan pointer to the start of that block, even though there may still be gray objects in the previous block (for example D). The secondary scan pointer keeps track of the earliest gray objects (for example, in block B). If the primary scan pointer catches up with the free pointer, Moon scans from the secondary scan pointer, until the primary scan pointer points to gray objects again. If the secondary scan pointer catches up with the free pointer as well, GC is complete.

Moon's algorithm copies objects in hierarchical order. For example, in FIG. 1C, Moon's algorithm first copies $o_1$ and its children, $o_2$ and $o_3$, into the same block. Next, it copies $o_4$ (the first child of $o_2$) into a different block. At this point, the block with $o_4$ has a gray object at the primary scan pointer, so Moon proceeds to copy the children of $o_4$ into the same block as $o_4$. Only when it is done with that block does it continue from the primary scan pointer, which still points into $o_2$.

The mutator is the part of an executing program that is not part of the GC: the user program, and run time system components such as the JIT compiler. Moon's GC is concurrent to the mutator, but there is only one active GC thread at a time, no parallel GC threads.

One problem with Moon's algorithm is that it scans objects twice when the secondary scan pointer advances through already black objects (for example in block C in FIG. 5).

Figure 6:
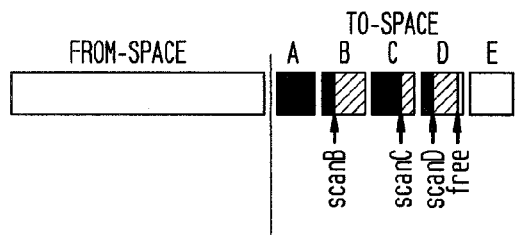

Wilson, Lam, and Moher, [Paul R. Wilson, Michael S. Lam, and Thomas G. Moher, "Effective: "static-graph" reorganization to improve locality in a garbage-collected system" In *Programming Language Design and Implementation (PLDI)*, 1991] improve Moon's algorithm by avoiding re-scanning of black objects. FIG. 6 illustrates Wilson, Lam, and Moher's algorithm. It keeps track of the scan pointers in all partially scanned blocks. When the block with the free pointer contains gray objects (for example block D), scanning proceeds in that block; otherwise, it proceeds from the earliest block with gray objects (for example block B). The copy order of Wilson, Lam, and Moher's algorithm is identical to that of Moon's algorithm (see FIG. 1C). The hierarchical copying GC algorithm by Wilson, Lam, and Moher is neither parallel nor concurrent.

In 1985, Halstead published the first parallel GC algorithm [Robert H. Halstead, Jr. Multilisp: A language for concurrent symbolic computation. *Transactions on Programming Languages and Systems (TOPLAS)*, 7(4), 1985]. It is based on Baker's GC [Henry G. Baker, Jr. List processing in real time on a serial computer. *Communications of the ACM (CACM)*, 21(4), 1978], which is an incremental variant of Cheney's GC [C. J. Cheney. A nonrecursive list compacting algorithm.

Figure 7:
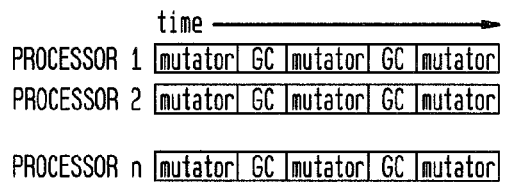

*Communications of the ACM (CACM)*, 13(11), 1970]. Halstead's GC works on shared-memory multiprocessor machines with uniform access time to the shared memory. The garbage collector works in SIMD (single instruction, multiple data) style: each worker thread performs the same GC loop on different parts of the heap. The mutator may be SIMD or MIMD (multiple instruction, multiple data). As illustrated in FIG. 7, at any given point in time, either GC threads are running or mutator threads are running, but not both. The GC is parallel, but not concurrent.

Figure 8:
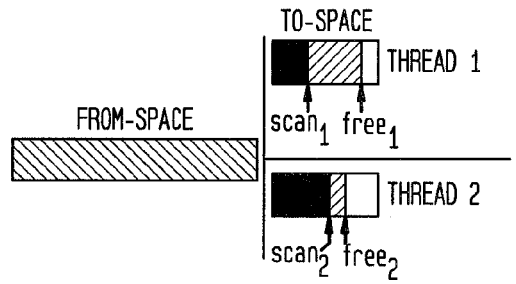

Halstead's algorithm partitions to-space into n equally sized parts on an n-processor machine. FIG. 8 illustrates the heap organization for n=2. Worker thread i has a scan pointer scans and a free pointer frees, which point to gray objects and empty space in their respective parts of to-space. Termination detection is simple: when $scan_i=free_i$ for all i, then there are no more gray objects to scan anywhere. Since each thread has its own private part of to-space, the threads do not need to synchronize when scanning objects in to-space or allocating memory in to-space. But they do need to synchronize on individual objects in from-space: if two worker threads simultaneously encounter pointers to the same object in from-space, only one of them should copy it and install a forwarding pointer.

Figure 1B:
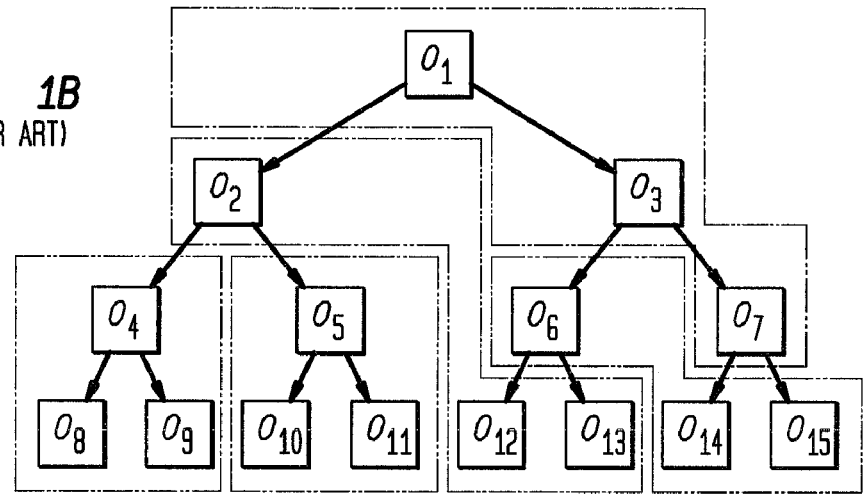
Figure 1C:
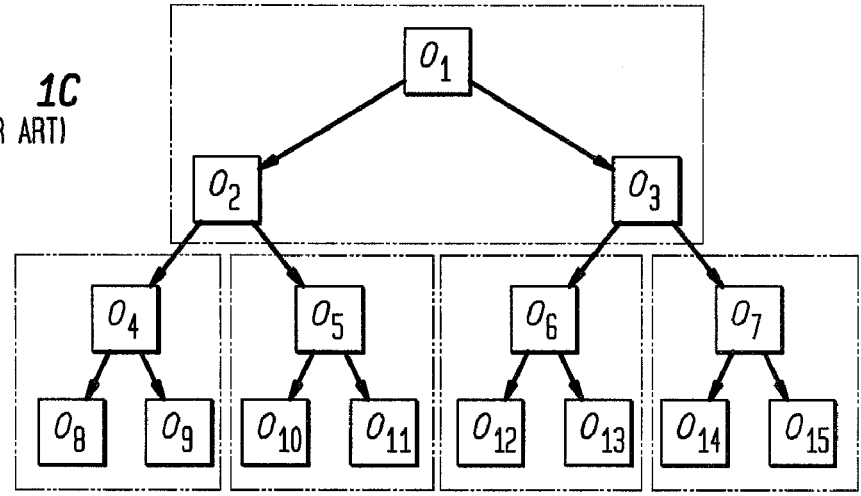

Like Cheney, Halstead has the advantage of requiring no separate queue or stack to keep track of gray objects, because within the part of to-space that belongs to a thread, the objects themselves are laid out contiguously and form an implicit FIFO queue. The algorithm therefore copies in breadth-first order (FIG. 1). Unfortunately, the static partitioning of to-space into n parts for n processors leads to work imbalance. This imbalance causes two problems: overflow and idleness. Overflow occurs when a worker thread runs out of empty space to copy objects into. Halstead solves this problem by providing additional empty space to worker threads on demand. Idleness occurs when one thread runs out of gray objects to scan while other threads are still busy. Halstead does not address the idleness problem caused by work imbalance.

In 1993, Imai and Tick published the first parallel GC algorithm with load balancing [Akira Imai and Evan Tick. Evaluation of parallel copying garbage collection on a shared-memory multiprocessor. *IEEE Transactions on Parallel and Distributed Systems*, 4(9), 1993]. Their algorithm extends Halstead's algorithm by over partitioning: on an n-processor machine, it partitions to-space into m blocks, where m>n.

Figure 9:
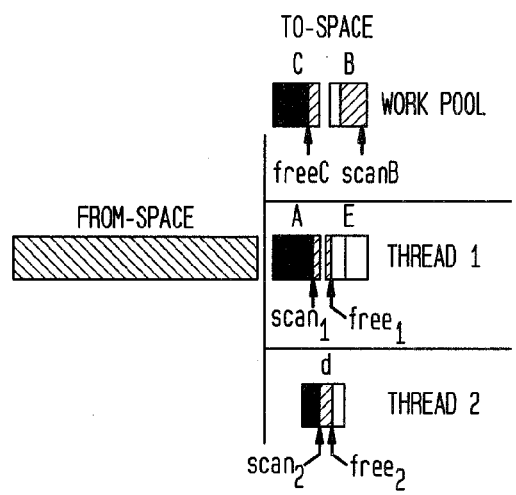

FIG. 9 illustrates Imai and Tick's GC. Each GC worker thread has one scan block with gray objects to scan, and one copy block with empty space to copy objects into. These blocks may be separate (A and E in Thread 1) or aliased (D in Thread 2). A shared work pool holds blocks currently unused by any thread. When a copy block has no more empty space, it is completely gray or black and gray. The thread puts the copy block into the work pool for future scanning, replacing it with a new empty block. When the scan block has no more gray objects, it is completely black, and thus done for this garbage collection: the thread gets rid of it. Then, the thread checks whether its private copy block has any gray objects. If yes, it aliases the copy block as scan block. Otherwise, it obtains a new scan block from the shared work pool. In addition to having to synchronize on from space objects like Halstead's algorithm, the algorithm by Imai and Tick also has to synchronize operations on the shared work pool.

The aliasing between copy and scan blocks avoids a possible deadlock where the only blocks with gray objects also have empty space. In addition, it reduces contention on the shared work queue when there are many GC threads. Imai and Tick's GC only checks for an aliasing opportunity when it needs a new scan block because the old scan block is completely black. Imai and Tick evaluated their algorithm on 14 programs written in a logic language. They report parallel speedups of 4.1× to 7.8× on an 8-processor machine. Their metric for speedup is not based on wall-clock time, but rather on GC "work" (number of cells copied plus number of cells scanned); it thus does not capture synchronization overhead or locality effects. The present invention effectively achieves hierarchical copy order with parallel GC threads.

Baseline Garbage Collector

The implementation of parallel hierarchical copying GC is based on the generational GC implemented in the International Business Machines Corporation's (IBM's) J9 Java Virtual Machine (JVM). It uses parallel copying for the young generation and concurrent mark-sweep with occasional stop-the-world compaction for the old generation. This is a popular design point in products throughout the industry. The baseline GC has exactly two generations, and young objects remain in the young generation for a number of birthdays that is adapted online based on measured survival rates. We are only concerned with copying of objects within the young generation or from the young generation to the old generation.

The baseline GC uses Imai and Tick's algorithm for the young generation. To accommodate tenuring, each worker thread manages two copy blocks: one for objects that stay in the young generation, and another for objects that get tenured into the old generation. Either block may be aliased as scan block.

Parallel Hierarchical GC

Parallel hierarchical GC achieves hierarchical copy order by aliasing the copy and scan blocks whenever possible. That way, it usually copies an object into the same block that contains an object that points to it. This is the parallel generalization of the single-threaded algorithm by Wilson, Lam, and Moher that uses the scan pointer in the block with empty space whenever possible. Blocks serve both as the work unit for parallelism and as the decomposition unit for hierarchical copying. It may be noted that the term "block", as used herein including the claims, refers to a cache line or page or other unit of Operating System (OS) and Hardware (HW) support for memory hierarchy.

Figure 10:
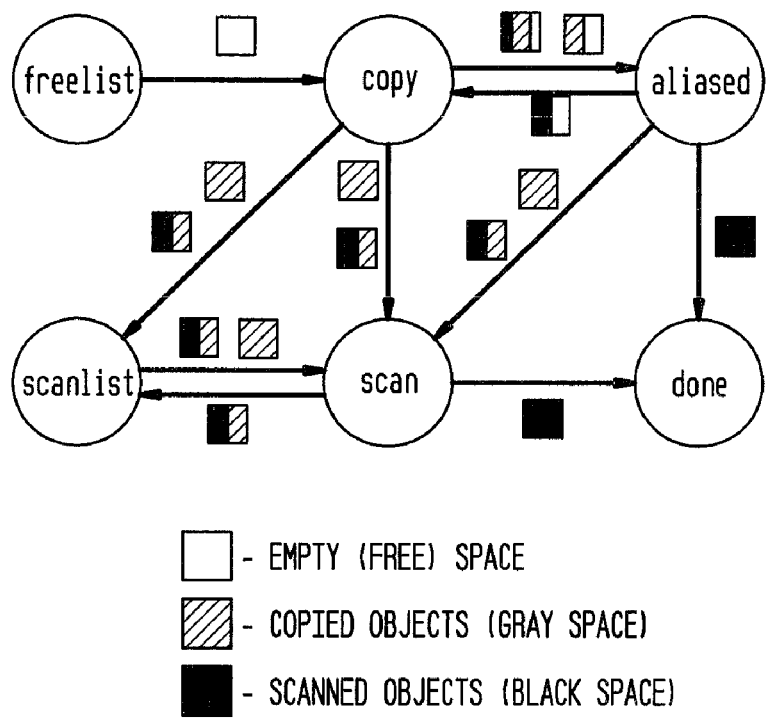
FIG. 10 shows the possible states of a block in to-space in accordance with a preferred embodiment of the present invention.

FIG. 10 shows the possible states of a block in to-space as circles. Transitions labels denote the possible coloring of the block when a GC thread changes its state. Blocks in states freelist, scanlist, and done belong to the shared work pool. No GC thread scans them or copies into them, and thus, their coloring cannot change. Blocks in states copy, scan, and aliased belong to a GC thread.

For example, a copy block must have room to copy objects into; therefore, all incoming transition labels to state copy are at least partially empty. If the copy block has some gray objects and some empty space, then it can serve both as copy block and as scan block simultaneously, and the GC aliases it; therefore, the transition from state copy to state aliased is labeled with colorings that include both gray and empty. The state machine in FIG. 10 is non-deterministic: the state and coloring of a block alone do not determine which transition it takes. Rather, the transitions depend on the colorings of both the copy block and the scan block of the worker thread.

TABLE 1

Transition logic in GC thread.

| copy | scan aliased | scan ▨ or ▥ | scan ■ |
|---|---|---|---|
| ▨ or ▥ | (no action) | scan → scanlist<br>copy → aliased | scan → done<br>copy → aliased |
| ☐ or ■ | aliased → copy<br>scanlist → scan | (no action) | scan → done<br>scanlist → scan |
| ■ or ▨ | aliased → scan<br>freelist → copy | copy → scanlist<br>freelist → copy | scan → done<br>copy → scan<br>freelist → copy |
| ■ | aliased → done<br>freelist → copy<br>scanlist → scan | (can't happen) | (can't happen) |

Table 1 shows the actions that the GC thread performs after scanning a slot in an object. For example, if the copy block contains both gray slots and empty space, and the scan block is already aliased with the copy block (column scan=aliased), no action is necessary before the next scanning operation. If the copy block contains gray and black and no empty space, or is completely gray, and the scan block is not aliased, the thread transitions the copy block to the aliased state, and either puts the scan block back on the scanlist if it still has gray slots, or transitions it to the done state if it is completely black.

As described in Table 1, parallel hierarchical GC leads to increased contention on the scanlist. To avoid this, the preferred implementation caches up to one block from the scanlist with each thread. Thus, if there is a cached block, the action scanlist→scan really obtains that cached block instead. Likewise, the transition scan→scanlist really caches the scan block locally, possibly returning the previously cached block to the scanlist in its stead.

Presented below is an evaluation of parallel hierarchical copying GC (PH), compared to parallel breadth-first copying GC (BF).

Like Cheney's algorithm and the other Cheney-based algorithms, parallel hierarchical GC requires no separate mark stack or queue of objects. Instead, the gray objects are consecutive in each block, thus serving as a FIFO queue. On the other hand, like Imai and Tick's algorithm, the GC of this invention requires a shared work pool of blocks to coordinate between GC threads. In addition, it requires per-block data to keep track of its state and coloring.

After scanning a gray slot, parallel hierarchical GC checks immediately whether it became possible to alias the copy block and the scan block. Since this check happens on the innermost loop of the GC algorithm, it must be fast. The immediacy of this check is what leads to hierarchical order like in the algorithms by Moon and by Wilson, Lam, and Moher.

The goal of hierarchical copy order is improved mutator locality. But of course, it also affects GC locality and load balancing. This effect can be positive or negative.

As mentioned earlier, in the preferred implementation, each GC thread actually manages two copy blocks, one each for young and old objects. Only one of them can be aliased at a time.

Experimental Setup

Experiments were conducted with a modified version of the International Business Machine Corporation Java 2 Platform Standard Edition (J2SE) 5.0 J9 GA Release (IBM's product Java Virtual Machine, running on real hardware in common desktop and server operating systems. This section discusses the methodology.

The platform for the following four sections was a dual-processor IA32 SMT system running Linux operating system. The machine has two 3.06 GHz Pentium 4 Xeon processors with hyperthreading. The memory hierarchy consists of an 8 KB L1 data cache (4-way associative, 64 Byte cache lines); a 512 KB combined L2 cache (8-way associative, 64 Byte cache lines); a 64 entry data TLB (4 KB pages); and 1 GB of main memory. The platforms for other sections are described there.

TABLE 2

Benchmarks.

| Name | Suite | Description | MB |
|---|---|---|---|
| SPECjbb2005 | jbb05 | business benchmark | 149.3 |
| antlr | DaCapo | parser generator | 1.4 |
| banshee | other | XML parser | 84.6 |
| batik | DaCapo | movie renderer | 15.0 |
| bloat | DaCapo | bytecode optimizer | 11.5 |
| chart | DaCapo | pdf graph plotter | 25.0 |
| compress | jvm98 | Lempe I-Ziv compressor | 8.8 |
| db | jvm98 | in-memory database | 13.6 |
| eclipse | other | development environment | 4.8 |
| fop | DaCapo | XSL-FO to pfd converter | 8.5 |
| hsqldb | DaCapo | in-memory JDBC database | 22.6 |
| ipsixql | Colorado | in-memory XML database | 2.5 |
| jack | jvm98 | parser generator | 1.5 |
| javae | jvm98 | Java compiler | 13.3 |
| javalex | other | lexer generator | 1.0 |
| javasrc | Ashes | code cross-reference tool | 61.3 |
| jbytemark | other | bytecode-level benchmark | 6.5 |
| jess | jvm98 | expert shell system | 2.3 |
| jpat | Ashes | protein analysis tool | 1.1 |
| jython | DaCapo | Python interpreter | 2.1 |
| kawa | other | Scheme compiler | 3.1 |
| mpegaudio | jvm98 | audio file decompressor | 1.0 |
| mtrt | jvm98 | multi-threaded $$tracer | 10.4 |
| pmd | DaCapo | source code analyzer | 7.0 |
| ps | DaCapo | postscript interpreter | 229.3 |
| soot | DaCapo | bytecode analyzer | 33.0 |

Table 2 shows the benchmark suite, consisting of 26 Java programs: SPECjbb2005, the 7 SPECjvm98 programs, the 10 Da-Capo benchmarks, 2 Ashes benchmarks, and 6 other big Java language programs. Column "MB" gives the minimum heap size in which the program runs without throwing an OutOfMemoryError. The rest of this discussion reports heap sizes as n× this minimum heap size.

All timing numbers herein are relative.

To reduce the effect of noise on the results, all experiments consist of at least 9 runs Java Virtual Machine process invocations), and usually several iterations (application invocations within one Java Virtual Machine process invocation). For each SPECjvm98 benchmark, a run contains around 10 to 20 iterations at input size 100. Each run of a DaCapo benchmark contains two or more iterations on the largest input.

Speedups

This section shows the effect of hierarchical copying on runtime for 25 Java programs. A 26th program, SPECjbb2005, is discussed in more detail below.

TABLE 3

Speedups for all benchmarks except SPECjbb2005.

| | % Speed up $\left(1 - \frac{PH}{BF}\right)$ at heap size | | | | C.I. | # GCs |
|---|---|---|---|---|---|---|
| Benchmark | 1.33× | 2× | 4× | 10× | (4×) | (10×) |
| db | +21.9 | +22.9 | +23.5 | +20.5 | 0.6 | 40 |
| javasrc | 0 | +3.5 | 0 | +3.0 | 2.5 | 110 |
| mtrt | 0 | 0 | 0 | +3.4 | 4.6 | 482 |

TABLE 3-continued

Speedups for all benchmarks except SPECjbb2005.

| | % Speed up $\left(1 - \frac{PH}{BF}\right)$ at heap size | | | | C.I. | # GCs |
|---|---|---|---|---|---|---|
| Benchmark | 1.33x | 2x | 4x | 10x | (4x) | (10x) |
| jbytemark | +3.3 | 0 | 0 | 0 | 1.6 | 1,761 |
| javac | +2.8 | +0.9 | +1.6 | +3.0 | 0.5 | 309 |
| chart | 0 | +3.0 | 0 | 0 | 3.0 | 126 |
| jpat | 0 | 0 | 0 | +2.6 | 0.7 | 14,737 |
| banshee | 0 | +2.1 | 0 | 0 | 3.7 | 6 |
| javalex | +1.0 | +1.0 | +1.7 | +1.6 | 0.6 | 201 |
| jython | 0 | +1.3 | 0 | 0 | 2.3 | 893 |
| eclipse | 0 | 0 | +1.2 | 0 | 1.0 | 9 |
| mpegaudio | 0 | 0 | 0 | +1.0 | 0.9 | 15 |
| compress | 0 | 0 | 0 | +1.0 | 1.8 | 142 |
| fop | 0 | 0 | 0 | 0 | 1.1 | 391 |
| hsqldb | 0 | 0 | 0 | 0 | 1.1 | 239 |
| kawa | 0 | 0 | 0 | 0 | 0.0 | 13 |
| soot | 0 | 0 | 0 | 0 | 1.1 | 237 |
| batik | 0 | 0 | 0 | -1.4 | 0.7 | 89 |
| jack | 0 | -1.4 | -0.6 | 0 | 0.4 | 1,440 |
| antlr | -1.9 | -1.3 | -1.0 | -1.1 | 0.9 | 3,070 |
| jess | -2.8 | -2.4 | -1.5 | 0 | 0.7 | 3,558 |
| ps | -3.0 | -2.7 | -2.2 | -1.3 | 0.8 | 59 |
| bloat | 0 | -1.7 | 0 | -4.7 | 1.1 | 341 |
| pmd | -1.8 | 0 | 0 | -5.1 | 3.3 | 775 |
| ipsixql | -6.0 | -6.5 | -8.7 | -5.9 | 0.7 | 3,433 |

The speedup columns of Table 3 show the percentage by which parallel hierarchical copying (PH) speeds up (+) or slows down (−) run time compared to the baseline parallel breadth-first copying (BF). They are computed as $$1 - \frac{PH}{BF},$$

where PH and BF are the respective total run times. For example, at a heap size of 4× the minimum, parallel hierarchical copying speeds up db's run time by 23.5% compared to breadth-first. When the speedup or slowdown is too small to be statistically significant (based on Student's t-test at 95% confidence), the table shows a "0". Column "C.I." shows the confidence intervals for the 4×numbers as a percentage of the mean run time. The confidence intervals at other heap sizes are similar. Finally, Column "#GCs" shows the number of garbage collections in the runs at heap size 10×; smaller heaps cause more garbage collections.

None of the benchmarks experienced speedups at some heap sizes and slowdowns at others. The benchmarks are sorted by their maximum speedup or slowdown at any heap size. Out of these 25 programs, 13 speed up, 4 are unaffected, and 8 slow down. The discussion below will show that SPECjbb2005 also speeds up. While speedups vary across heap sizes, we observed no pattern. The program with the largest slowdown is ipsixql, which maintains a software LRU cache of objects. Because the objects in the cache survive long enough to get tenured, but then die, ipsixql requires many collections of the old generation. The program with the largest speedup is db, which experiences similar speedups from depth-first copy order. Depth-first copy order requires a mark stack, hence it is not considered further herein.

Parallel hierarchical copy order speeds up the majority of the benchmarks compared to breadth-first copy order, but slows some down. It may be possible to avoid the slowdowns by deciding the copy order based on runtime feedback.

Mutator vs. Collector Behavior

Parallel hierarchical copying GC tries to speed up the mutator by improving locality. The discussion above showed that most programs speed up, but some slow down. The discussion immediately below explores how mutator and garbage collection contribute to the overall performance.

TABLE 4

Mutator and collector behavior at heap size 4x.

| | Mutator | | | Collector | | |
|---|---|---|---|---|---|---|
| | Time | | | Time | | |
| | $1 - \frac{PH}{BF}$ | TLBmisses | | $1 - \frac{PH}{BF}$ | TLBmisses | |
| Benchmark | | BF | PH | | BF | PH |
| db | +24.3 | 7.0 | 5.5 (−) | −37.6 | 0.6 | 0.6 (0) |
| javasrc | 0 | 1.0 | 1.0 (0) | 0 | 0.6 | 0.5 (−) |
| mtrt | 0 | 2.4 | 2.5 (0) | −15.4 | 0.6 | 0.5 (−) |
| jbytemark | 0 | 0.3 | 0.3 (+) | +9.4 | 0.6 | 0.6 (0) |
| javac | +2.0 | 1.6 | 1.5 (−) | 0 | 0.6 | 0.5 (−) |
| chart | 0 | 0.8 | 0.8 (0) | 0 | 0.7 | 0.6 (0) |
| jpat | 0 | 2.6 | 2.7 (0) | 0 | 0.8 | 0.8 (0) |
| banshee | 0 | 0.4 | 0.4 (0) | −3.3 | 1.0 | 1.0 (0) |
| javalex | +1.7 | 0.7 | 1.2 (+) | 0 | 0.5 | 0.5 (0) |
| jython | 0 | 1.5 | 1.5 (0) | −9.0 | 0.7 | 0.7 (−) |
| eclipse | +3.1 | 0.9 | 0.8 (−) | 0 | 0.7 | 0.5 (−) |
| mpegaudio | 0 | 0.4 | 0.4 (0) | −5.7 | 0.8 | 0.7 (−) |
| compress | 0 | 1.2 | 1.1 (0) | 0 | 1.0 | 1.0 (0) |
| fop | +1.3 | 1.4 | 1.2 (0) | 0 | 0.5 | 0.4 (−) |
| hsqldb | 0 | 1.2 | 1.1 (−) | 0 | 0.5 | 0.5 (0) |
| kawa | +0.4 | 1.3 | 1.3 (0) | −9.6 | 0.6 | 0.5 (−) |
| soot | 0 | 1.7 | 1.7 (0) | −3.9 | 0.5 | 0.5 (0) |
| batik | 0 | 0.8 | 0.8 (0) | 0 | 0.6 | 0.6 (0) |
| jack | 0 | 1.2 | 1.2 (0) | −9.2 | 0.5 | 0.4 (−) |
| antlr | 0 | 0.8 | 0.8 (0) | −6.5 | 0.6 | 0.6 (0) |
| jess | 0 | 2.1 | 2.1 (0) | −7.2 | 0.5 | 0.4 (−) |
| ps | 0 | 1.3 | 1.7 (+) | −25.6 | 0.5 | 0.4 (−) |
| bloat | 0 | 1.2 | 1.1 (0) | −2.7 | 0.6 | 0.5 (−) |
| pmd | 0 | 1.6 | 1.7 (0) | −13.5 | 0.6 | 0.5 (−) |
| ipsixql | −2.9 | 0.8 | 0.8 (0) | −13.2 | 0.5 | 0.4 (−) |

Table 4 breaks down the results of running in 4× the minimum heap size into mutator and collector. The "Time" columns show improvement percentages of parallel hierarchical copying (PH) compared to breadth-first (BF); higher numbers are better, negative numbers indicate degradation. The "TLB misses" columns show miss rates per retired instruction, in percent (lower is better; which TLB and other hardware characteristics will be discussed below in more detail). A (+) indicates that PH has a higher miss rate than BF, a (−) indicates that it has a lower miss rate, and a (0) indicates that there is no statistically significant difference. The benchmarks are ordered by the total speedup from Table 3.

When there is a measurable change, with few exceptions, the mutator speeds up and the collector slows down. Even fop and kawa, which experienced no overall speedup, experience a small mutator speedup. Usually, TLB miss rates decrease both in the mutator and in the GC. For the mutator, this explains the speedup; for the GC, this does not prevent the slowdown caused by executing more instructions to achieve hierarchical order. The large reduction in mutator TLB misses for db (from 7% to 5.5%) leads to an overall speedup despite having the largest GC slowdown (of 37.6%). Hierarchical copying only slows down collections of the young generation, but since most objects in db die young, collections of the young generation dominate GC cost.

To conclude, parallel hierarchical copying trades GC slowdown for mutator speedup. This is a reasonable tradeoff as long as GC scaling on multiprocessors is not impacted.

Scaling on Multi-Processor Systems

The discussion herein shows how to achieve hierarchical copy order in a parallel GC. The goal of parallel GC is to scale well in multi-processor systems by using all CPUs for collecting garbage. This is necessary to keep up with the mutator, since it uses all CPUs for allocating memory and generating garbage. The present discussion investigates how well parallel hierarchical copying GC scales.

Figure 11:
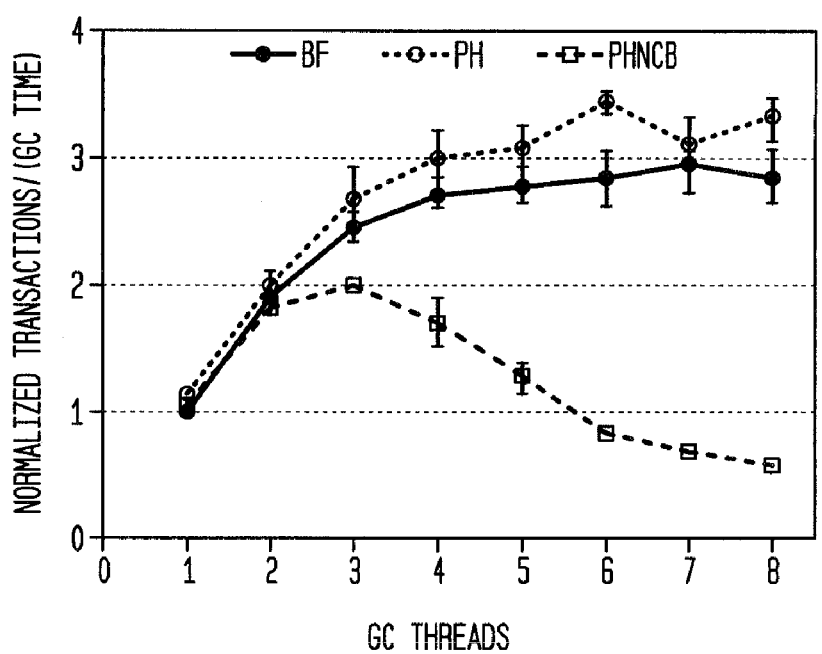
FIG. 11 illustrates how the present invention scales in multi-processor systems.

FIG. 11 shows how the collector scales for SPECjbb2005. SPECjbb2005, the SPEC Java business benchmark, models a server that uses multiple parallel mutator threads to service transactions against a database. For this experiment, the number of mutator threads is fixed at 8, and when the mutator threads are stopped for collection, the GC uses between 1 and 8 threads. The platform is an IA32 Windows system with four 1.6 GHz Pentium 4 Xeon processors with hyperthreading (i.e. 8 logical CPUs), 256 KB of L2 cache, 1 MB of L3 cache, and 2 GB of RAM. The heap size is 1 GB, out of which the young generation uses 384 MB.

All numbers in FIG. 11 are mutator transactions per GC time. Higher numbers indicate that the mutator gets more mileage out of each second spent in GC, indicating better GC scaling. There are curves for parallel breadth-first (BF) copying, parallel hierarchical (PH) copying, and PH with no cached block (PHNCB). All numbers are normalized to BF at 1 thread. The error bars show 95% confidence intervals. With 8 GC worker threads, both BF and PH run around 3 times faster than with 1 thread. Without the cached block optimization from the above section, PH would not scale: it would run 46% slower with 8 threads than with only 1 thread (PHNCB).

Figure 12A:
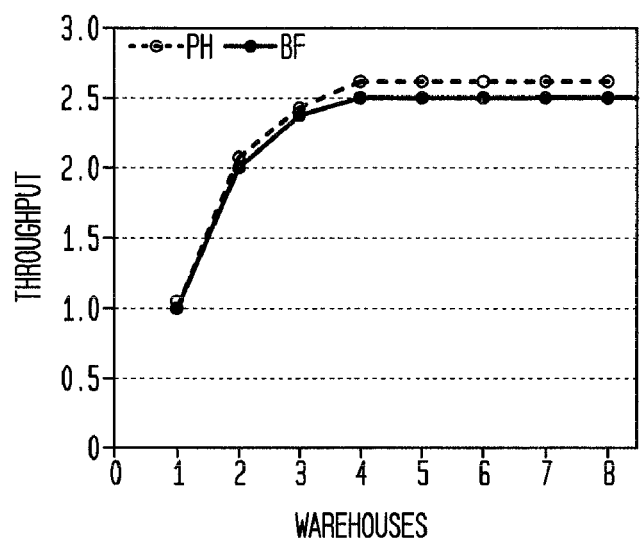
FIGS. 12a-12c show the throughput of this invention on three hardware platforms.
Figure 12B:
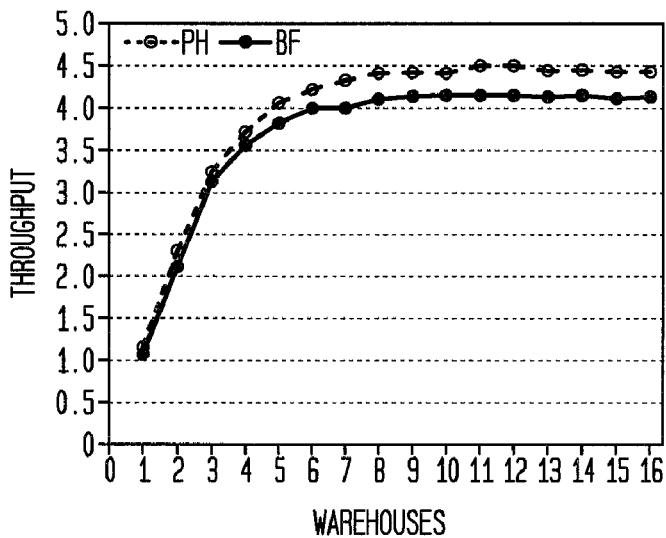
Figure 12C:
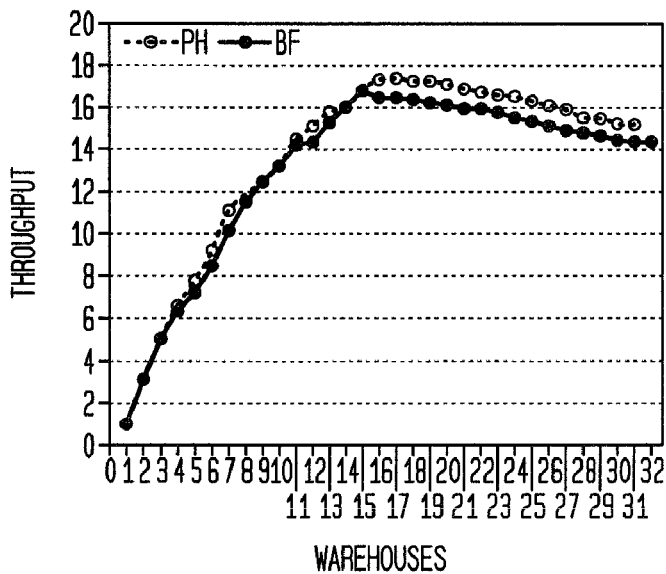
Figure 13A:
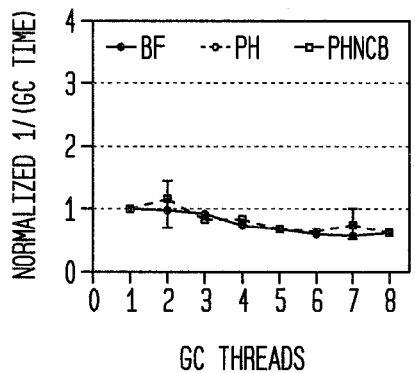
FIGS. 13a-13f show garbage collection scaling for various benchmarks.
Figure 13B:
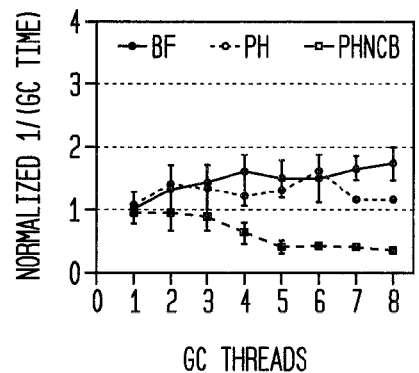
Figure 13C:
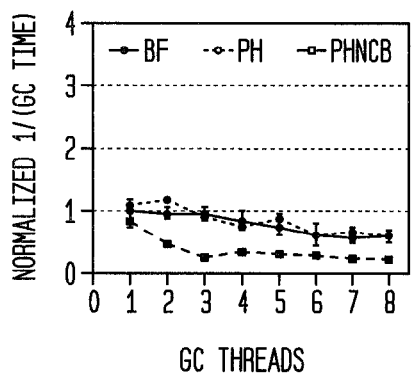
Figure 13D:
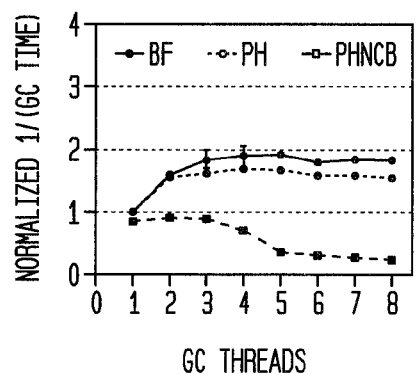
Figure 13E:
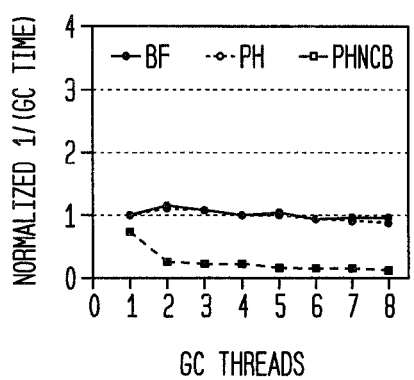
Figure 13F:
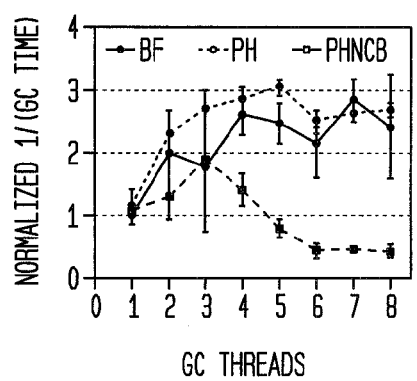

Whereas FIG. 11 shows how SPECjbb2005's GC time scales, FIG. 12 shows how its total throughput scales on three hardware platforms. SPECjbb2005 measures throughput as transactions per second, which should increase with the number of parallel mutator threads ("warehouses"). The three platforms are:

a. A 2-processor EM64T system running Linux operating system. The machine has two 3.4 GHz Pentium 4 Xeon processors with hyperthreading, with 1 MB of L2 cache and 4 GB of RAM. On this machine, SPECjbb2005 used a 1 GB heap with a 384 MB young generation.
b. The 4-processor IA32 Windows operating system from FIG. 11.
c. An 8-processor Power system running AIX operating system. The machine has eight 1.5 GHz Power 5 processors with hyperthreading, with a total of 144 MB of L3 cache and 16 GB of RAM. On this machine, we ran SPECjbb2005 in a 3.75 GB heap with a 2.5 GB young generation.

In each of the graphs 12a-c, the x-axis shows the number of warehouses (parallel mutator threads), and the y-axis shows the throughput (transactions per second) relative to the BF throughput with 1 warehouse. Higher is better in these graphs, because it means that more transactions complete per second.

On all three platforms, throughput increases until the number of warehouses reaches the number of logical CPUs, which is twice the number of physical CPUs due to hyperthreading. At that point, parallel hierarchical GC has a 3%, 8%, and 5% higher throughput than the baseline GC. Increasing the number of threads further does not increase the throughput, since there are no additional hardware resources to exploit. But hierarchical GC sustains its lead over the baseline GC even as threads are increased beyond the peak.

FIG. 13 shows GC scaling for the SPECjvm98 benchmarks except mpegaudio (which does very little GC). The platform is the same as for FIG. 11, and the heap size is 64 MB. Except for mtrt, all of these programs are single-threaded. Since the amount of mutator work is constant between the different collectors, FIG. 13 measures parallel GC scaling as the inverse of GC time, normalized to GC throughput for BF with 1 thread. For most SPECjvm98 benchmarks, neither PH nor BF scale well. This is in part due to their small memory usage compared to SPECjbb2005: there is not enough work to distribute on the parallel GC worker threads. As for SPECjbb2005, PH with no cached block (PHNCB) scales worse than either PH or BF.

To conclude, parallel hierarchical copying GC scales no worse with increasing load caused by parallel applications than parallel breadth-first copying GC. A single-threaded GC, on the other hand, would have a hard time keeping up with the memory demands of several parallel mutators.

Time-Space Tradeoffs

In a small heap, GC has to run more often, because the application exhausts memory more quickly. This increases the cumulative cost of GC. On the other hand, in a small heap, objects are closer together, which should intuitively improve locality. This section investigates how these competing influences play out.

FIG. 14 shows the run times of two representative benchmarks, SPECjvm98 db and javac, at 6 different heap sizes from 1.33× to 10× (occupancy 75% to 10%). The x-axis shows the heap size; each graph carries labels for absolute heap size at the top and labels for relative heap size at the bottom. The y-axis shows run time relative to the best data point in the graph. In these graphs, lower is better, since it indicates faster run time. There are three graphs for each benchmark, one each for total time, mutator time, and GC time. While the y-axis for total and mutator time goes to 1.5, the y-axis for GC time goes to 3.

Figure 14A:
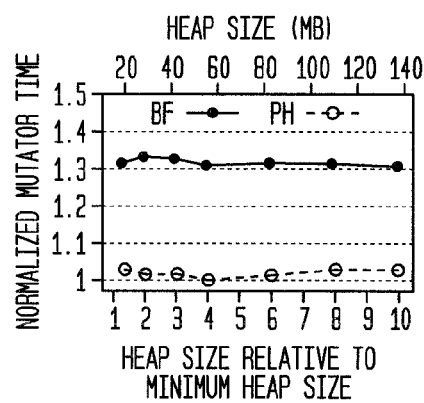
FIGS. 14a-14f show the run times of two representative benchmarks.
Figure 14B:
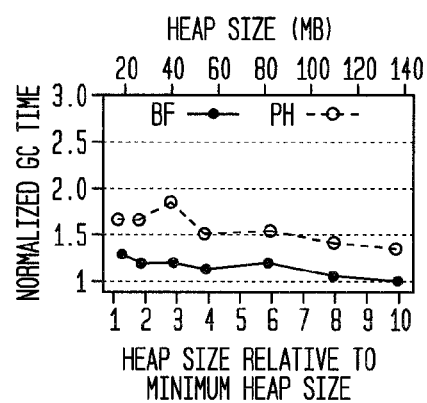
Figure 14C:
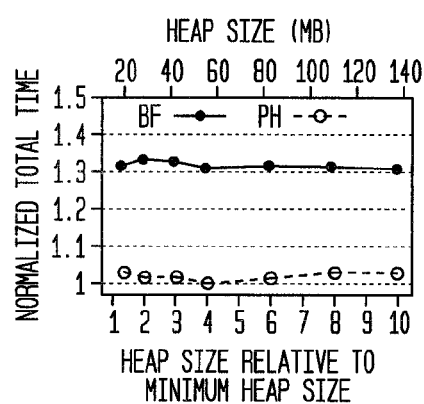
Figure 14D:
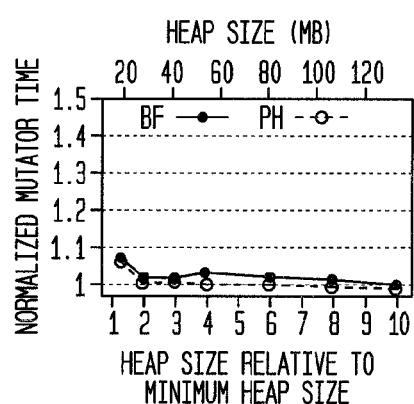
Figure 14E:
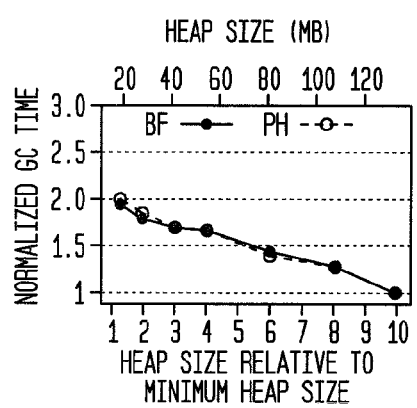
Figure 14F:
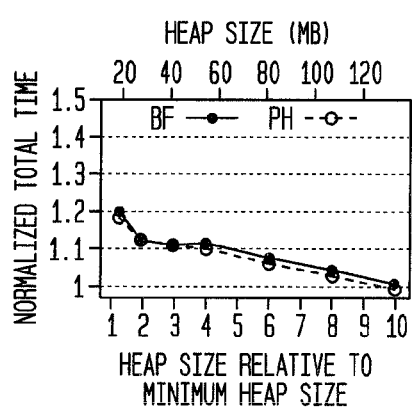
Figure 15A:
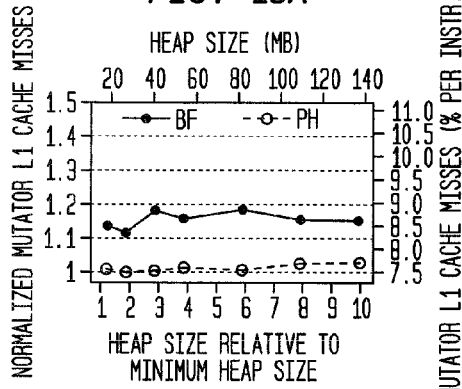
FIGS. 15a-15f illustrate the low cache and TLB misses obtained using the present invention.
Figure 15B:
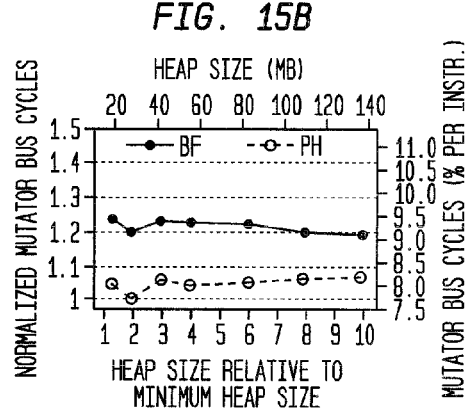
Figure 15C:
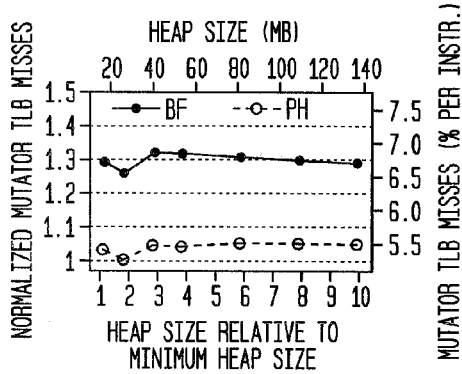
Figure 15D:
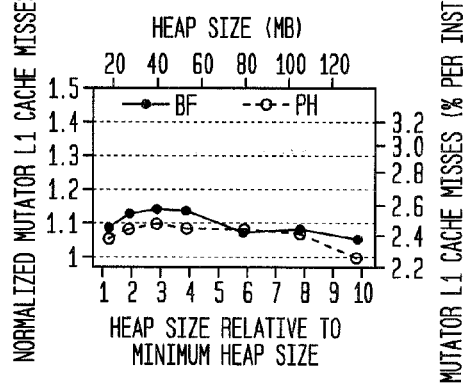
Figure 15E:
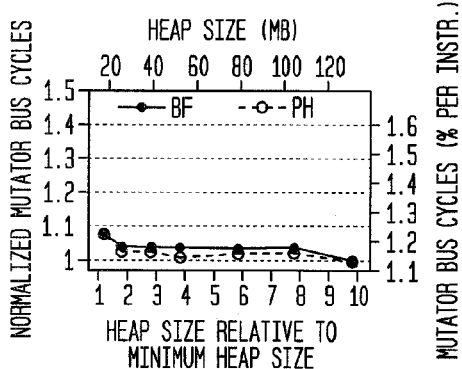
Figure 15F:
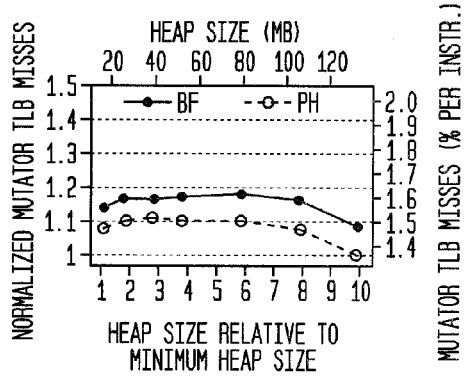

FIGS. 14a+d show that parallel hierarchical copying (PH) speeds up the mutator for both db and javac. FIGS. 14b+e show that, as expected, total GC cost is higher in smaller heaps. But this effect is more significant for javac than for db, because javac has a higher nursery survival rate [Martin Hirzel, Johannes Henkel, Amer Diwan, and Michael Hind. Understanding the connectivity of heap objects. In *International Symposium on Memory Management (ISMM)*, 2002]. That is also the reason why PH slows down the collector for db, while causing no significant change in collector time for javac. The overall behavior of db is dominated by the mutator speedup caused by PH (FIG. 14c), whereas the overall behavior of javac is dominated by the decrease of GC cost in larger heaps (FIG. 14f).

This confirms the conclusions from above: parallel hierarchical GC performs well in both small and large heaps.

Cache and TLB Misses

The goal of hierarchical copying is to reduce cache and TLB misses by colocating objects on the same cache line or page. This section uses hardware performance counters to measure the impact of hierarchical copying on misses at different levels of the memory subsystem.

Pentium processors expose hardware performance counters through machine specific registers (MSRs), and many Linux operating system distributions provide a character device,/dev/cpu/*/msr, to access them. Doing modprobe msr ensures the presence of this device; for experiments in user mode, the files must be readable and writeable for users. The JVM sets up the registers for collecting the desired hardware events at the beginning of the run, and reads them at the beginning and end of GC, accumulating them separately for the mutator and the GC.

FIG. 15 shows the results. The x-axis shows the heap size; each graph carries labels for absolute heap size at the top and labels for relative heap size at the bottom. The y-axis shows the hardware metric; each graph carries labels for relative miss rate at the left and labels for absolute miss rate at the right. In these graphs, lower is better, since it indicates fewer misses. The denominator of all ratios is retired instructions. See Table 4 for statistical confidence on the TLB miss rates; there are some variations due to noise. The "Bus cycles" event measures for how many cycles the bus between the L2 cache and main memory was active. This indicates L2 misses, for which Pentium 4 does not provide a reliable direct counter. Note that bus clock speeds are usually an order of magnitude slower than processor clock speeds. Parallel hierarchical copying reduces mutator misses on all measured levels of the memory subsystem: L1 data cache, combined L2 cache, and TLB. It reduces misses for both db and javac, at all heap sizes. As expected, the reduction in TLB misses is the most significant, because the hierarchical GC uses 4 KB blocks as the decomposition unit, which coincides with the page size. With BF, db has high L1 and TLB miss rates, and PH reduces the miss rates significantly. That explains the large speedup that the above sections report for db.

To conclude, parallel hierarchical copying GC reduces TLB misses most, while also reducing L1 and L2 cache misses significantly. These reduced miss rates translate into reduced run time.

Pointer Distances

The above section already demonstrated that hierarchical copying reduces cache and TLB misses. This section validates that it achieves that by colocating objects on the same cache line or page.

For this experiment, the GC records the distance between the address of a pointer and the address of the object it points to just after a copying or forwarding operation. Pointers with an absolute distance under 64B are classified as "Line", and pointers with an absolute distance between 64B and 4 KB are classified as "Page". The numbers only consider pointers from objects in the young generation to other objects in the young generation, and from newly tenured objects in the old generation to other newly tenured objects in the old generation. Among other things, this disregards pointers between young and old objects; those have longer distances, but are rare, and hierarchical copying cannot colocate them on the same page.

TABLE 5

Pointer distances.

| Benchmark | BF | | PH | |
|---|---|---|---|---|
| | Line | Page | Line | Page |
| db | 0.0 | 9.4 | 23.6 | 65.1 |
| SPECjbb2005 | 0.0 | 0.5 | 6.8 | 72.4 |
| javasre | 0.3 | 20.8 | 17.6 | 32.2 |
| mtrt | 2.2 | 28.5 | 24.1 | 46.7 |
| jbytemark | 0.1 | 4.0 | 11.2 | 11.6 |
| javae | 1.2 | 33.9 | 33.1 | 29.1 |
| chart | 0.1 | 4.9 | 58.0 | 5.6 |
| jpat | 0.1 | 7.2 | 46.3 | 5.3 |
| banshee | 0.6 | 28.1 | 15.9 | 46.8 |
| javalex | 1.6 | 19.6 | 21.9 | 17.2 |
| jython | 0.2 | 11.1 | 4.5 | 35.6 |
| eclipse | 1.9 | 25.9 | 28.6 | 37.3 |
| mpegaudio | 0.9 | 33.0 | 16.7 | 50.8 |
| compress | 5.4 | 33.2 | 23.2 | 40.1 |
| fop | 0.2 | 32.8 | 11.9 | 52.0 |
| hsqldb | 0.1 | 28.9 | 20.3 | 64.9 |
| kawa | 3.0 | 28.0 | 23.4 | 32.1 |
| soot | 6.8 | 30.1 | 21.5 | 38.1 |
| batik | 1.4 | 32.9 | 20.5 | 45.5 |

TABLE 5-continued

Pointer distances.

| Benchmark | BF | | PH | |
|---|---|---|---|---|
| | Line | Page | Line | Page |
| jack | 0.4 | 35.5 | 26.4 | 49.4 |
| antlr | 2.0 | 32.8 | 20.1 | 44.4 |
| jess | 0.3 | 6.7 | 8.0 | 6.5 |
| ps | 0.1 | 24.1 | 32.2 | 33.9 |
| bloat | 4.0 | 24.5 | 34.5 | 26.5 |
| pmd | 1.7 | 28.5 | 27.4 | 29.0 |
| ipsixql | 1.0 | 20.2 | 32.6 | 21.1 |

Table 5 shows pointer distances. For example, db with breadthfirst copying yields 9.4% pointers that are longer than 64 bytes but under 4 KB, whereas parallel hierarchical copying improves that to 65.1%. Except for SPECjbb2005, all runs used heaps of 4× the minimum size.

These numbers show that parallel hierarchical copying succeeds in colocating objects on the same 4 KB page for the majority of the pointers. This explains the reduction in TLB misses observed in Table 4. Also, parallel hierarchical copying colocates objects on the same 64-byte cache line much more often than the baseline garbage collector. This explains the noticeable reduction in L1 and L2 cache misses observed above.

While hierarchical copying is tremendously successful at improving spatial locality of connected objects, wall-clock numbers from a real system (Table 3) paint a more sober picture. This discrepancy underlines three points: (i) Hierarchical copying trades GC slowdown for mutator speedup. The result of this tradeoff is determined by the concrete benchmark, GC implementation, and platform. (ii) Hierarchical copying aims at decreasing TLB and cache miss rates. When the application working set is small compared to the memory hierarchy of the machine, miss rates are already so low that decreasing them further helps little. (iii) Hierarchical copying optimizes for the "hierarchical hypothesis" that connectivity predicts affinity. In other words, it assumes that objects with connectivity (parents or siblings in the object graph) also have affinity (the application accesses them together). Not all applications satisfy the hierarchical hypothesis.

It should be noted that the present invention, or aspects of the invention, can be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A method of performing parallel, hierarchical copying garbage collection (GC) to achieve a hierarchical copy order of a set of objects with parallel garbage collection threads, wherein said objects are related in a from-space in a given hierarchical order including one or more first generation objects, one or more second generation objects, and one or more third generation objects, each of the second generation objects being a child of one of the first generation objects, and each of the third generation objects being a child of one of the second generation objects, the method comprising the steps of:

executing a plurality of threads in parallel to copy said set of objects in said hierarchical order from the from-space to a multitude of blocks in a to-space including copying all of the first generation objects from the from-space to the to-space, then copying all of the second generation objects from the from-space to the to-space, and then copying all of the third generation objects from the from-space to the to-space, said multitude of blocks including copy blocks and scan blocks, including the steps of:

copying some of the objects from the from-space into the copy blocks in the to-space;

scanning the scan blocks to identify additional objects in the from-space, and copying said additional objects into the copy blocks in the to-space; and aliasing the copy blocks in the to-space.

2. A method of claim 1, including the additional steps of examining the placement of some of the copied objects on the copy blocks, and placing others of the copied objects on the copy blocks based on said placement of some of the copied objects.

3. A method of claim 2, wherein the placing increases the frequency of intra-block pointers.

4. A method of claim 2, wherein the placing increases the frequency of siblings on the same block.

5. A method of claim 1, further comprising the step of enabling interrupting the scanning of a block, and deferring it for later, after every GC operation of scanning one slot or copying one object.

6. A method of claim 5 including the additional step of maintaining a scan pointer to the middle of an object in a block that is not actively being scanned by a thread.

7. A method of performing parallel, hierarchical copying garbage collection (GC) to achieve a hierarchical copy order of a set of objects with parallel garbage collection threads, wherein said objects are related in a from-space in a given hierarchical order including one or more first generation objects, one or more second generation objects, and one or more third generation objects, each of the second generation objects being a child of one of the first generation objects, and each of the third generation objects being a child of one of the second generation objects, the method comprising the steps of:

a) having multiple threads that simultaneously perform work for GC to copy said set of objects in said hierarchical order from the from-space to a multitude of blocks in a to-space including copying all of the first generation objects from the from-space to the to-space, then copying all of the second generation objects from the from-space to the to-space, and then copying all of the third generation objects from the from-space to the to-space, said multitude of blocks including copy blocks and scan blocks, including the steps of: copying some of the objects from the from-space into the copy blocks in the to-space; scanning the scan blocks to identify additional objects in the from-space, and copying said additional objects into the copy blocks in the to-space; and aliasing the copy blocks and the scan blocks in order to copy said set of objects into the to-space in said hierarchical order; and b) using the copy block and the scan blocks as the work unit for the parallel copying.

8. A method of claim 7, comprising the further steps of: examining the placement of objects on blocks; and changing the placement of objects on blocks based on said examining.

9. A method according to claim 1, where
i) roots and remembered sets get scanned to identify target objects in from-space, and the target objects get copied to to-space
ii) after an object gets copied, its to-space copy eventually gets scanned to identify zero or more target objects it points to in from-space, and the target objects also get copied to to-space
iii) to-space copies of objects get scanned in a defined order, which is used to achieve changing the placement of the copies of target objects on to-space blocks.

10. A method according to claim 9, where
for each object that has already been copied to a block in to-space, the object is used to identify zero or more target objects it points to in from-space, and the target objects are copied to another block in to-space, the block of the scanned object having a defined relationship with the block of the copied object.

11. A method according to claim 10, wherein said block of the scanned object is sometimes caused to be the same as said block of the copied object.

12. A method according to claim 11, wherein the step that uses a defined order includes the step of, when one of the target objects is copied, checking to determine whether the block containing the scanned object is the same as the block to which the target object gets copied.

13. A method according to claim 12, wherein the step of checking to determine whether the block containing the scanned object is the same as the block to which the target object gets copied, causes the two blocks to be the same if possible.

14. A garbage collection method of copying objects from a from-space to a to-space, comprising the steps of:

using a plurality of threads to copy a multitude of said objects simultaneously from said from-space to a plurality of blocks in said to-space, wherein said objects are arranged in a hierarchical order in said from-space and include one or more first generation objects, one or more second generation objects, and one or more third generation objects, and including copying all of the first generation objects from the from-space to the to-space, then copying all of the second generation objects from the from-space to the to-space, and then copying all of the third generation objects from the from-space to the to-space;

examining the placement of the objects in said blocks; and changing the placement of objects in said blocks based on said examining.

15. A method according to claim 14, wherein:
the using step includes the step of using said multiple threads to scan some of said plurality of blocks;
each of said threads scans one of said plurality of blocks at a time;
each of said plurality of blocks is, at one time, a copy block; and
at least some of said plurality of blocks transition from a copy block to a scan block.

16. A method according to claim 15, wherein:
a first object is copied into a given one of the blocks, and a second objects is copied into another one of the blocks, said another one of the blocks having a defined relationship with said given one of the blocks;

said given one of the blocks is caused to be the same block as said another one of the blocks; and comprising the further step of the second object is copied to said another one of the blocks, checking to determine whether said another one of the copy blocks is the same as said given one of the blocks; and if the said determination is that the said another one of the blocks is not the same as said given one of the blocks, then for said second object, the block into which the object is copied is chosen to be the same block as said given one of the blocks, if possible.

* * * * *